(No Model.)
J. R. &. H. WATSON.
CARBONATING COLUMN.
No. 523,390. Patented July 24, 1894.
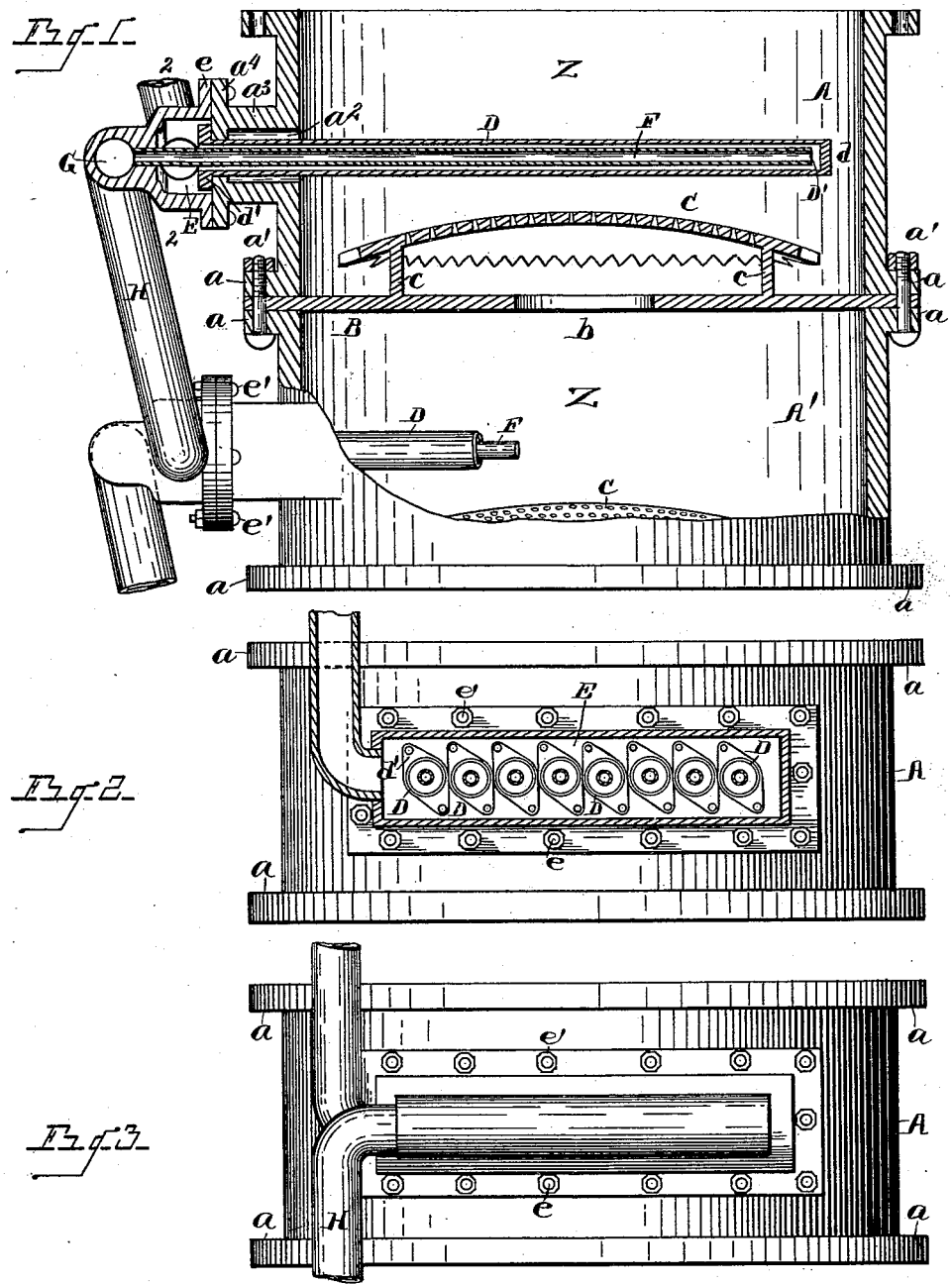

UNITED STATES PATENT OFFICE.

JOHN R. WATSON AND HERBERT WATSON, OF WYANDOTTE, MICHIGAN.

CARBONATING-COLUMN.

SPECIFICATION forming part of Letters Patent No. 523,390, dated July 24, 1894.

Application filed December 4, 1893. Serial No. 492,689. (No model.)

*To all whom it may concern:*

Be it known that we, JOHN R. WATSON and HERBERT WATSON, subjects of the Queen of Great Britain, residing at Wyandotte, county of Wayne, State of Michigan, have invented a certain new and useful Improvement in the Manufacture and Treatment of Soda; and we declare the following to be a full, clear, and exact description of the invention, such as will enable others skilled in the art to which it appertains to make and use the same, reference being had to the accompanying drawings, which form a part of this specification.

Our invention relates to certain new and useful improvements in the manufacture and treatment of soda by the so-called ammonia process, and has for its object more particularly a novel apparatus for carbonating columns for saturating ammoniated brine with carbonic acid.

Our invention consists of the construction, combination and arrangement of devices and appliances hereinafter specified and claimed and illustrated in the accompanyining drawings, in which—

Figure 1 is a partial vertical section of the apparatus embodying our invention. Fig. 2 is a vertical section on the line 2—2 of Fig. 1. Fig. 3 is a side elevation of one of the cylinders of a column with the device thereto attached.

Our invention contemplates the provision of a series of compartments Z of any desired number, two being shown in Fig. 1 the one being located above the other, said compartments separated from each other by any suitable means. The compartments are constructed preferably of cylinders or shells A, A', &c., which may be flanged at their adjacent ends, as shown at "$a$" bolts $a'$ passing through the adjacent flanges to unite the two adjacent cylinders.

As shown in the drawings, the compartments formed by the cylinders A, A' are separated from each other by means of a plate B the periphery of which projects between the flanges "$a$" of the two adjacent cylinders, the bolts $a'$ passing therethrough and holding the separating plates in place. Supported upon the separating plates B is a perforated baffling plate C preferably toothed upon its edge. The baffling plate is supported upon the separating plate B by means of standards "$c$" in any suitable manner. We prefer to cast the separating plate B and the baffling plate C with its supports intermediate the separating plate and baffling plate, in a single integral piece. The separating plate B is constructed with a central orifice "$b$," for the passage of the ascending gases therethrough. The baffling plate C rises above the separating plate B and is preferably constructed of convex form on its upper surface, and being located over the orifice "$b$" prevents the liquor in the column from flowing directly down the center, but the liquor is distributed by means of the toothed and perforated baffling plate in its descent. As many of these cylinders A, A' with the separating plates and baffling plates interposed therebetween, may be employed as may be desired, a column being thus built up of similar cylinders with the interior separating and baffling plates. The column, it will be understood, is employed more particularly for saturating the ammoniated brine with carbonic acid, and is built of a high cylindrical form.

Our improvements relate, more particularly to the construction, combination and arrangement of devices therewith for lowering the temperature of the liquor and in the improved construction of the separating and baffling plates.

Our improved device for lowering the temperature of the liquor consists of the arrangement of pipes and their connections, the pipes entering into the various compartments, as shown. To this end D represents a series of pipes passing across each of the cylinders toward the opposite side from which said pipes enter, said pipes being closed at their inner ends, as shown at "$d$" Fig. 1. To admit the pipes D, the cylinders are constructed each with a series of orifices, as at $a^2$, the cylinders being constructed with outwardly projecting tubular shoulders $a^3$ flanged at their outer ends, as shown at $a^4$. The pipes D are flanged at their outer ends, as shown at $d'$, set snugly against the flange $a^4$, as shown, the pipes D opening at their outer ends into a compartment E. Located within each of the pipes D is a pipe F spaced from the inner surface of the corresponding pipe D, the pipe F being open at both ends, its outer end communicating with a compartment G, and its inner end communicating with a chamber D' within the corresponding pipe D. The compartments E and G may be formed of a single casting flanged on its inner edge, as shown at "e," the flange "e" being engaged with the flange $a^4$ in any suitable manner, as by bolts e'. It will be obvious that water admitted into the compartment G passes through the series of pipes F and is emitted therefrom into the pipes D and is carried therethrough back into the compartment E, the water thus circulating through the compartment G thence through pipes F thence through pipes D into compartment E.

From a given compartment E, the water is carried into a compartment G thereabove by means of the communicating pipe H, the compartments G and E engaged with one cylinder thus communicating with a corresponding compartment connected with the adjacent cylinder so that the water can be forced through the entire series of cooling pipes D, F throughout the entire series of cylinders in the column. We prefer that the flanges d' should be of the form shown in Fig. 2 in order to give suitable strength for attaching the same to the flanges $a^4$ and yet permit the introduction of the greatest number of corresponding pipes D. The form of construction shown allows the pipes D of a series to be arranged very closely together. This construction also allows for an expansion of the pipes D toward the closed end "d," this provision for expansion being necessary owing to the varying temperatures in the practical working.

The casting forming the compartments E and G is in the nature of a water box made with two compartments, one compartment communicating directly with the pipes F and the other with the pipes D. Any suitable number of cooling pipes may be put in according to the size of the cylinders used.

Suitable provision of ordinary description, not shown, is made for taking off the heated water and for admitting fresh water at any point, the apparatus thus effecting a perfect circulation for cooling purposes.

The liquor or ammoniated brine to be carbonated is first introduced into the upper portion of the column.

It will be understood that ammoniated brine in the top of the column descends and the resulting product is drawn off at the bottom of the column.

Carbonic acid gas introduced at the bottom of the column rises to the top combining with the ammoniated brine to form bi-carbonate of soda, and generates heat which is taken away by the cooling apparatus above described.

By the construction of the cooling pipes, above described and herewith shown, it will be obvious that it is possible to use cast iron for the pipes D, thereby preventing the corrosion and eating away of the metal which take place when wrought iron or steel pipes are used in contact with the liquor. The pipes are easily detached and no leakage of ammoniacal liquor can arise because of the expansion of the metal as where wrought iron or steel pipes are expanded into a tube-plate in the ordinary method.

The compartments G may fitly be termed water feeding compartments, as thence the water is supplied to the pipes F, while the compartments E may be termed water receiving compartments, as they receive the water from the pipes D.

What we claim as our invention is—

1. In a carbonating column the combination with a series of cylinders located one upon another forming a series of interior compartments Z, of water compartments located upon the exterior of each of said cylinders, a series of exterior cooling pipes projecting horizontally into the corresponding compartment Z communicating at one end with one of said water compartments and closed at the opposite end, a series of horizontal interior pipes located within said exterior pipes respectively communicating at one end with the other water compartment and open at their opposite ends, substantially as set forth.

2. In a carbonating column, the combination with a series of cylinders located one upon another forming a series of interior compartments Z, of water compartments located upon the exterior of each of said cylinders, a series of exterior cooling pipes projecting horizontally into the corresponding compartment Z communicating at one end with one of said water compartments and closed at the opposite end, a series of horizontal interior pipes located within said exterior pipes respectively communicating at one end with the other water compartment and open at their opposite ends, the various water compartments upon the series of cylinders communicating one with another throughout the series, substantially as set forth.

3. In a carbonating column, the combination with a series of cylinders located one upon another forming a series of interior compartments Z, of water feeding, and water receiving compartments located upon the exterior of each of said cylinders, a series of exterior cooling pipes projecting horizontally into the corresponding compartment Z communicating at one end with the adjacent water receiving compartment and closed at the opposite end, a series of horizontal interior pipes located within said exterior pipes respectively, communicating at one end with the adjacent water feeding compartment and open at their opposite ends, the water receiving compartment of one cylinder communicating with the water feeding compartment of the adjacent cylinder whereby the various water compartments of the series of cylinders communicate one with another, substantially as set forth.

4. In a carbonating column, the combination with a series of cylinders located one upon another, each formed with hollow shoulders $a^3$ projecting from the side of the cylinder and flanged at their outer edges, water compartments E and G having their casing engaged with the flanged edge of said shoulders, a series of exterior pipes projecting horizontally within the corresponding cylinder communicating with the water compartment E, a series of horizontal interior pipes located within the exterior pipes communicating therewith and with the water compartment G, the inner ends of the exterior pipes being closed, the opposite ends of the pipes passing through said shoulders, substantially as set forth.

In testimony whereof we sign this specification in the presence of two witnesses.

JOHN R. WATSON.
HERBERT WATSON.

Witnesses:
N. S. WRIGHT,
H. R. WHEELER.